(12) United States Patent
Reed

(10) Patent No.: US 6,386,818 B1
(45) Date of Patent: May 14, 2002

(54) LIVE BOTTOM TRAILER EFFECTIVELY HAVING EXTENDIBLE REAR END VIA OUTWARD PIVOTING DOORS

(75) Inventor: Michael F. Reed, Aurora, IL (US)

(73) Assignee: Etnyre Trailer Company, Oregon, IL (US)

(*) Notice: Subject to any disclaimer, the term of this patent is extended or adjusted under 35 U.S.C. 154(b) by 0 days.

(21) Appl. No.: 09/572,636

(22) Filed: May 17, 2000

(51) Int. Cl.$^7$ .................................................. B60P 1/00
(52) U.S. Cl. ........................................................ 414/502
(58) Field of Search ................................. 414/519, 528; 296/50, 51, 55, 26.06, 26.08, 146.8, 146.9, 195

(56) References Cited

U.S. PATENT DOCUMENTS

| | | | |
|---|---|---|---|
| 1,634,798 A | * 7/1927 | Orendorff | |
| 2,248,374 A | 7/1941 | Mitchell | 296/51 |
| 2,263,199 A | 11/1941 | Wachter et al. | 214/67 |
| 2,434,718 A | 1/1948 | Recker | 214/83 |
| 2,645,522 A | 7/1953 | Kersey | 298/23 |
| 2,856,233 A | 10/1958 | Boyce et al. | 298/23 |
| 3,548,540 A | 12/1970 | Cullings | 49/163 |
| 3,722,717 A | 3/1973 | Stryczek | 214/83.22 |
| 3,757,969 A | 9/1973 | Smith | 214/83.3 |
| 3,933,382 A | 1/1976 | Counts et al. | 292/144 |
| 3,998,343 A | 12/1976 | Fors | 214/518 |
| 4,068,769 A | 1/1978 | Sweet et al. | 214/83.18 |
| 4,437,705 A | 3/1984 | Heberlein | 298/1 R |
| 4,699,428 A | 10/1987 | Vick | 298/23 MD |
| 4,723,817 A | 2/1988 | Wallan | 298/23 MD |
| 4,830,436 A | 5/1989 | Sockwell et al. | 298/8 R |
| 4,838,598 A | * 6/1989 | Hyde | |
| 4,892,456 A | 1/1990 | Hodgetts | 414/527 |
| 4,948,325 A | 8/1990 | Hodgetts | 414/527 |
| 4,989,918 A | 2/1991 | Biddy | 298/23 MD |
| 5,021,156 A | 6/1991 | Sloan | 210/241 |
| 5,029,927 A | 7/1991 | Totani | 296/50 |
| 5,062,669 A | 11/1991 | McManigal et al. | 292/60 |
| 5,449,212 A | 9/1995 | Seifert | 296/57.1 |
| 5,685,578 A | 11/1997 | Schneider | 292/144 |
| 5,895,193 A | * 4/1999 | Ung | |
| 5,934,862 A | 8/1999 | Brown et al. | 414/528 |
| 6,220,810 B1 | * 4/2001 | Wilkerson | |

FOREIGN PATENT DOCUMENTS

JP 56-50826 * 8/1981

* cited by examiner

Primary Examiner—William A. Rivera
(74) Attorney, Agent, or Firm—Leydig, Voit & Mayer, Ltd.

(57) ABSTRACT

A live bottom trailer or vehicle having horizontally outwardly pivoting doors as the tailgate. The live bottom trailer includes a hopper having an opening top with sidewalls converging towards and endless conveyor. The endless conveyor is operable to mobilize material in the hopper rearwardly toward the rear discharge area of the trailer. A pair of doors are hinged to the hopper sidewalls and pivot outwardly away from each other. The doors can be positioned in a rearward projecting manner such that they direct material more deeply into an asphalt paver. The doors are independently controlled by pneumatic or hydraulic cylinders to allow the material to be directed left or right. The mechanical linkage which connects the cylinders to the doors has an over center position such that the doors stay locked even if pressure in the cylinders is lost when material in the hopper is exerting rearward force on the doors of the hopper.

22 Claims, 7 Drawing Sheets

LIVE BOTTOM TRAILER EFFECTIVELY HAVING EXTENDIBLE REAR END VIA OUTWARD PIVOTING DOORS

FIELD OF THE INVENTION

The present invention relates generally to material transport vehicles and trailers, and more particularly to material transport vehicles and trailers that have a "live bottom" or endless conveyor for discharging material to the rear of the vehicle or trailer.

BACKGROUND OF THE INVENTION

Live bottom trailers and trucks are frequently used to transport a variety of loose materials such as sand, gravel, hot mix asphalt, recycled materials, salt, low slump concrete, and the like. One primary advantage of using a live bottom trailer or live bottom truck as opposed to a conventional hydraulic hoist dump truck is that a live bottom does not need to be hoisted or vertically elevated to discharge material from the rear of the truck bed. As such, live bottoms do not have the risks associated with conventional hydraulic hoist dump trucks such as interference with low electrical or telephone wires and the potential for tipping over due to vertical elevation of a hoisted dump body. Live bottoms also have certain operational advantages when feeding material into other hoppers. For example, live bottoms are easier to use when filling a hopper of an asphalt paver with hot mix asphalt material.

While live bottoms have their advantages, they are not without drawbacks. For example, one significant problem is that federal regulations require commercial vehicles to either have rear under-ride guards to prevent a smaller vehicle or car from riding underneath the trailer in the event of a rear end collision, or alternatively to have a rear tire location within 12 inches of the rear end of the trailer. For example such regulations are promulgated by the Department of Transportation, National Highway Traffic Safety Administration under CFR part 571, FMVSS 223 and 224, such regulations are hereby incorporated by reference.

Although the solution of simply locating the rear tires closer to the rear end would seem to at first blush be an easy way of solving the problem, such a solution would have the significant drawback of rendering live bottoms less practical. In particular, when it is necessary to feed material from the live bottom into another hopper such as an asphalt paver, the problem would arise that the rear end of the trailer would only stick a maximum of about 12 inches into the asphalt paver rather than more deeply toward the center or rear of the asphalt paver. As such, material would be directed less deep into the hopper of the asphalt paver and be subject to spillage out the sides of the asphalt paver and otherwise cause it to be used at less than its full capacity. Because of these drawbacks, this possible solution has not been implemented in the relevant art prior to the solution of the present invention.

The other solution of implementing a rear under-ride guard is also not desirable in that it would also interfere with the body of the asphalt paver. The additional costs of providing a rear under-ride and maintaining a rear under-ride guard over the life of the trailer is also undesirable. Rear under-ride guards also contribute weight to the vehicle and can further limit the amount of material carried by the trailer due to highway road weight limits.

The Inventor of the present invention has also realized that there have been other long-felt deficiencies in the more general material transport art as well. For example, material transport vehicles both of the live bottom type as well as the conventional hydraulic hoist type both are typically deficient from a practical standpoint in being able to adequately control the material discharge from the rear the vehicle and direct the material into more specific desirable locations.

SUMMARY OF THE INVENTION

It is a primary objective of the present invention to provide more practical live bottom material transport apparatus.

In that regard, it is another primary objective of the present invention to provide a live bottom material transport apparatus that is capable of delivering asphalt material deeper into asphalt pavers or otherwise direct material further rearwardly from the rear end of the live bottom hopper.

It is an objective of the present invention to provide a live bottom material transport apparatus that meets federal regulations with respect to rear under-ride guard requirements while at the same time being capable of discharging material a satisfactory or even improved distance relative to prior art live bottoms.

It is still another objective to provide a live bottom material transport apparatus that obtains better control over placement of material discharged from the rear of the live bottom hopper.

In accordance with these and other objectives, the present invention is directed towards a mobile live bottom transport apparatus that includes a pair of horizontally outwardly pivoting doors or other rearward projecting sidewall extensions at the rear end of the hopper. The doors effectively extend the rear end of the live bottom trailer by projecting horizontally rearwardly when the doors are open. It is an advantage of the outwardly pivoting doors that material is directed further rearwardly from the live bottom and that material is prevented from spilling out along the sides. The invention may be incorporated into the truck bed that is permanently attached to a vehicle, or alternatively incorporated into a trailer that may be selectively attached and detached from a vehicle.

It is an aspect of the present invention that the rear wheels of the vehicles can be practicably located further rearward close enough to the rear end of the trailer such that a rear under-ride guard is not necessary by virtue of the doors.

It is another aspect of the present invention that the doors are actuated to open and close the doors. The doors may be selectively actuated to provide a larger opening or a smaller opening in the discharge area of the trailer. Preferably a distributed control is provided such that the doors can be actuated independently of each other such that material can be directed left or right as desired. It is a further aspect that a lock in the preferred form of an over center condition in the mechanical linkage is provided to automatically lock the doors when in the closed position such that if pressure is lost in the actuators, the doors remain closed despite the fact that the load carried in the hopper is urging the doors open.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification, illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

For purposes of illustration and referring, a material transport apparatus according to a preferred embodiment of the present invention has been depicted as a live bottom trailer 20. The live bottom trailer 20 is illustrated as the type that may be readily attached and detached from semi-tractors. It will be appreciated that the invention may also be used in a commercial truck in which the hopper or truck bed is permanently secured to the rest of the truck.

Figure 1:
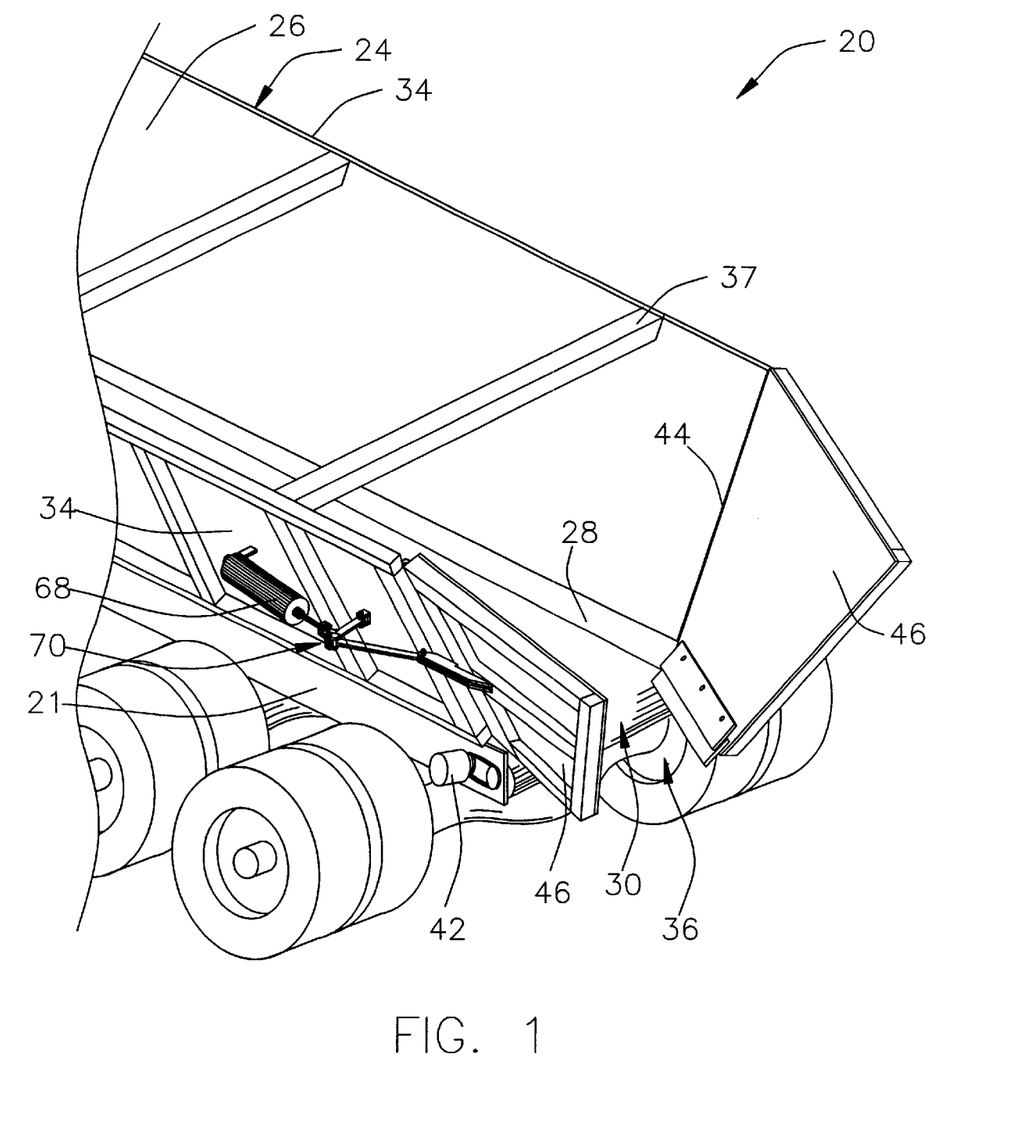
FIG. 1 is a fragmentary perspective illustration of a corner rear end view of a live bottom including outward pivoting doors, according to a preferred embodiment of the present invention.

The live bottom trailer 20 is supported with a chassis 21 on wheels 22 such that the trailer is mobile and can be moved around place to place for transporting the desired loose material such as sand, gravel, asphalt, or the like. The trailer 20 includes a hopper 24 having an open top 26 into which material is received via dumping and a bottom opening 28 in which a conveyor having the preferred form of an endless conveyor 30 is disposed. The hopper 24 is generally funnel-like such that loose material is directed vertically downward toward the conveyor via the assistance of gravity. The hopper 24 includes a front in the form of a traverse front wall 32 (FIG. 4), and a pair of sidewalls 34 extending horizontally rearwardly from the front wall 32 to a discharge area generally indicated at 36 where material can be discharged from the hopper 24. The sidewalls 34 slope inwardly and downwardly towards each other and the endless conveyor 30. The sidewalls 34 are disposed at an inclined angle between horizontal and vertical. In the preferred embodiment, the sidewalls 34 are generally planar structures in nature, but it will be appreciated that other shapes of sidewalls could also be used. The sidewalls 34 are sloped sufficient such that loose material generally does not stick to the walls 34 but instead slides downward toward the endless conveyor 30. Referring to FIG. 1, a cross brace 37 is shown extending across the top and connecting the upper ends of the sidewalls for support thereof.

It should be noted that the actual configuration of the conveyor apparatus is not important for understanding the invention, and that any conveyor apparatus that is suitable for live bottoms and mobilizing loose material such as sand, gravel, asphalt or the like toward the rear end of the vehicle would be sufficient. An exemplary endless conveyor mechanism for this type of application is disclosed in U.S. Pat. No. 5,934,862, assigned to E.D. Etnyre, Inc. the entire disclosure of which is incorporated by reference. Further details of one such exemplary conveyor mechanism can be had to that reference. With regards to the preferred embodiment of the present invention, it is suffice it to say that the endless conveyor 30 is operative to transport loose material to the discharge area 36 at the rear end of the trailer 20, and includes an endless conveying belt 38 entrained around front and rear sprockets 40 (See FIG. 8). The endless conveying belt 38 is driven by motor 42 along an endless path. The endless conveyor 30 could also be operated in reverse to retract extra loose material from a discharged load.

In accordance with the present invention, the discharge area 36 of the trailer 20 is effectively extended rearwardly by the provision of rearward extensions that have a position projecting rearward from the back edge 44 of the sidewalls 34. In the preferred embodiment, the rearward extensions take the form of a pair of outwardly pivoting doors 46. Each door 46 is hinged to one sidewall 34 through a hinge 48 that includes an elongate pivot pin 50 inserted through tubes 52 that are alternately affixed to the door 46 and the sidewall 34.

Figure 2:
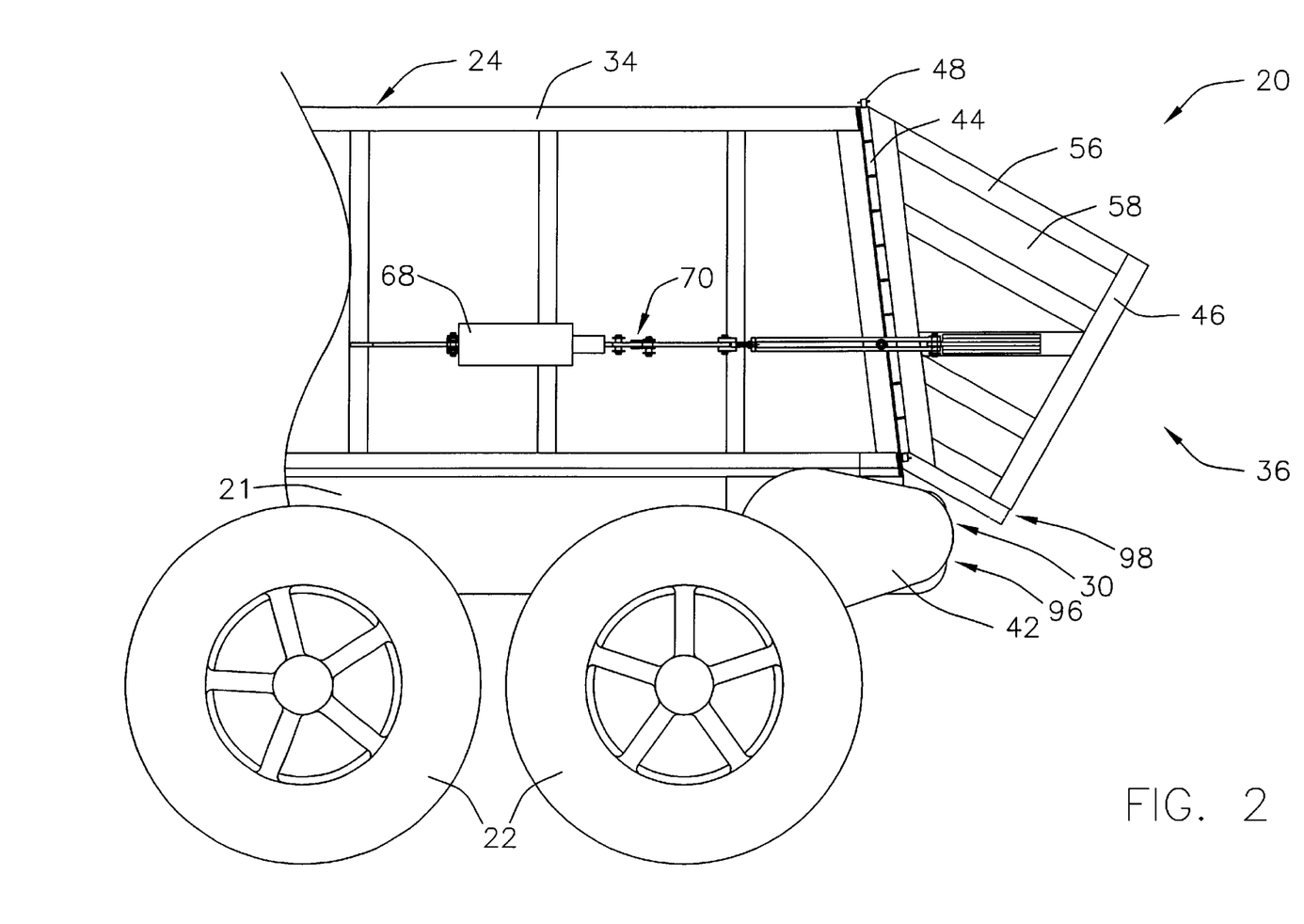
FIG. 2 is a fragmentary side view of a rear end portion of the live bottom illustrated in FIG. 1.
Figure 3:
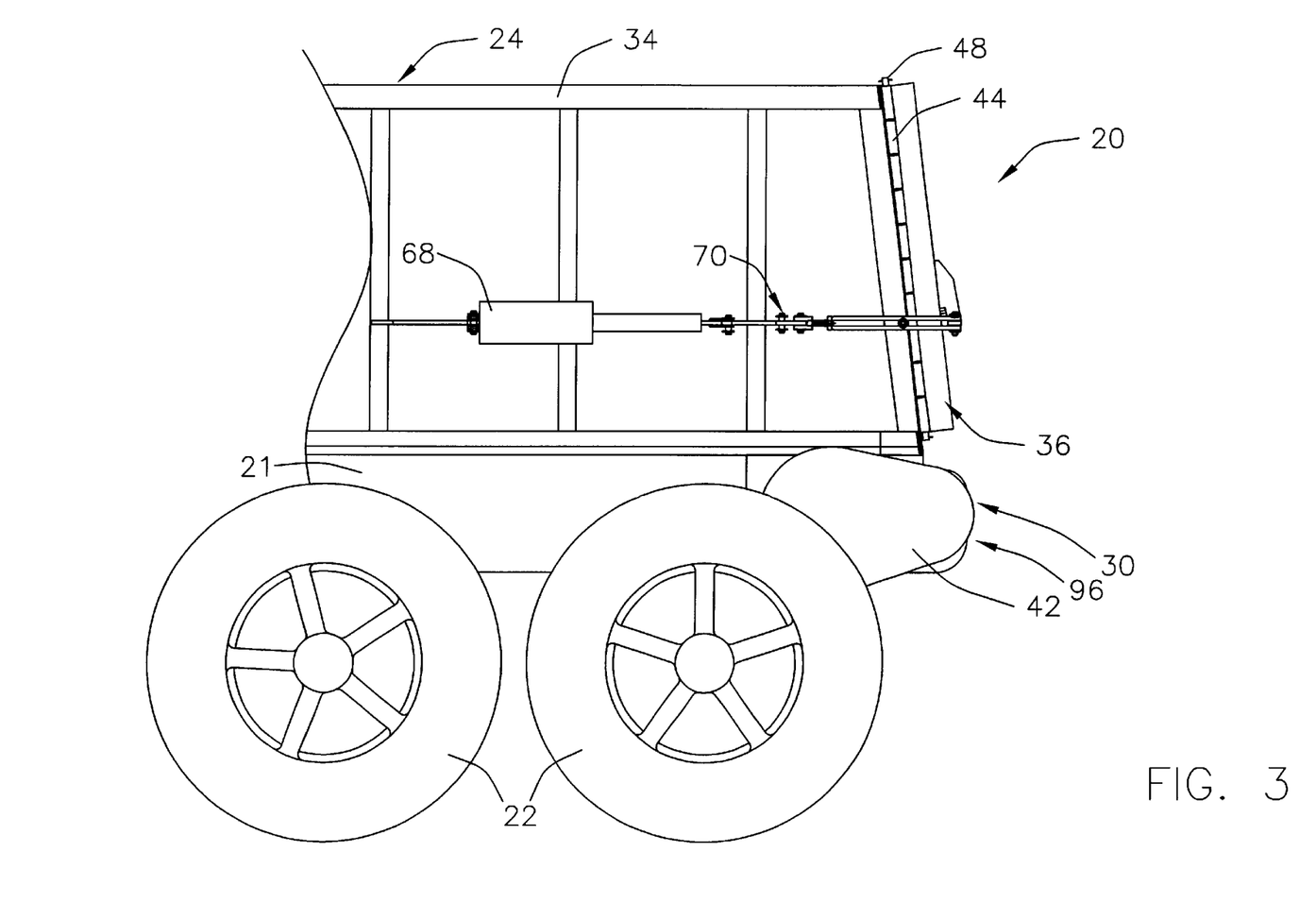
FIG. 3 is the same view as FIG. 2 but with the doors closed.
Figures 4, 5:
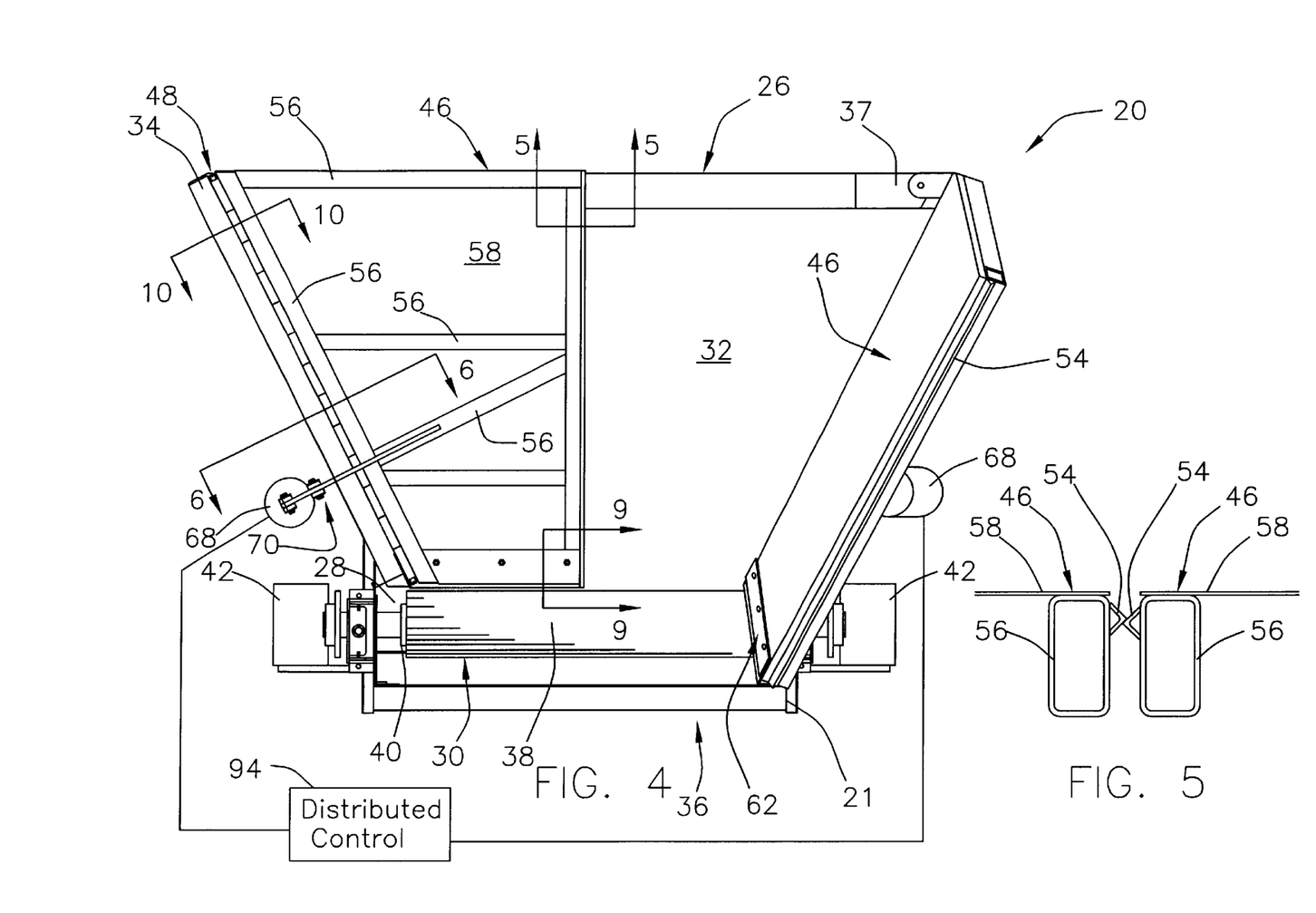
FIG. 4 is a rear end view of the live bottom illustrated in FIG. 1.
FIG. 5 is a cross section taken about line 5—5 in FIG. 4 (assuming both doors are closed).
Figure 8:
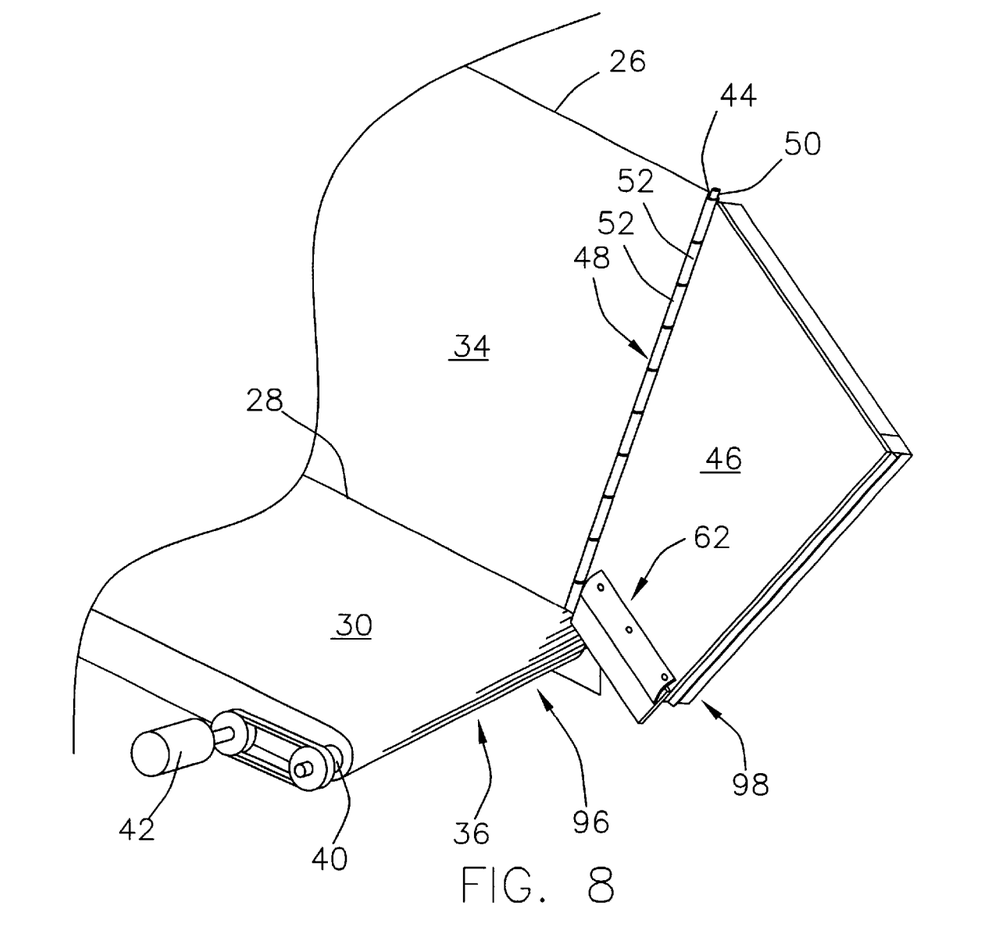
FIG. 8 is a similar view to FIG. 1 but enlarged and with certain structure removed to better illustrate other structure.
Figure 9:
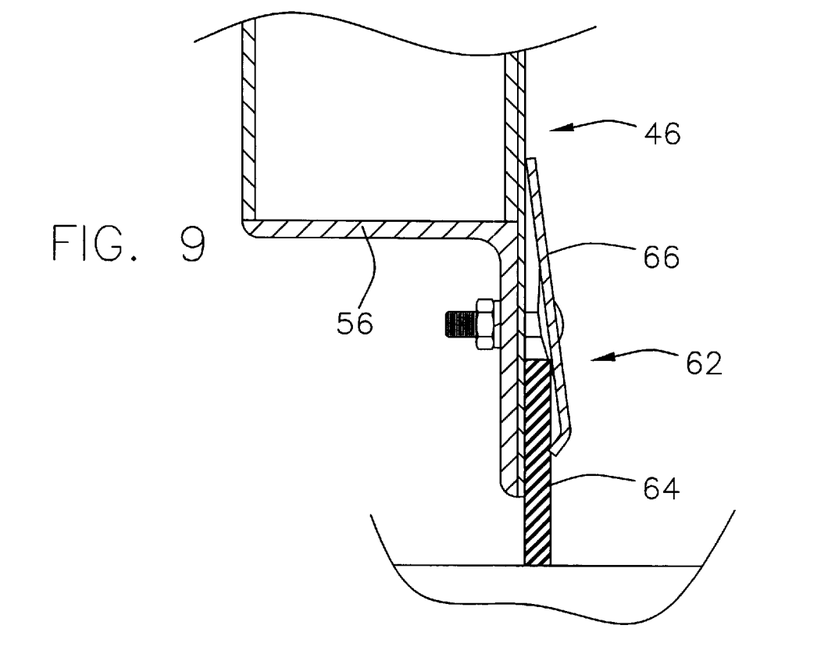
FIG. 9 is a cross section of the wiper mechanism taken about line 9—9 in FIG. 4.
Figure 10:
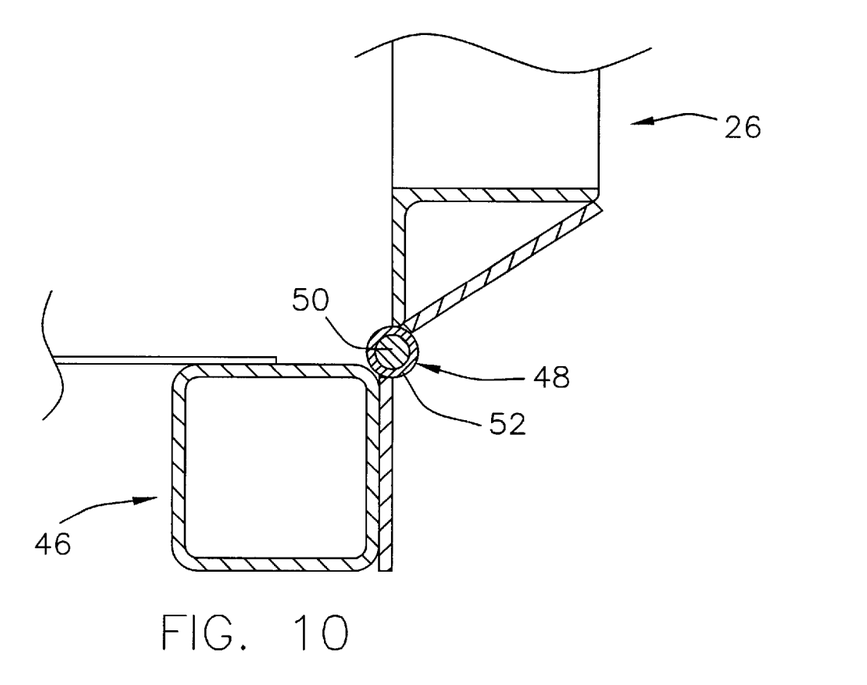
FIG. 10 is a cross section of FIG. 4 taken about line 10—10 inn FIG. 4 illustrating the hinge in further detail.

The doors 46 have a closed or retracted position in which the rear end of the trailer 20 is shorter as shown in FIG. 3, and an extended or open position in which the rear end of the trailer 20 has an extended position as shown in FIG. 2. In the closed retracted position as shown in FIG. 3 (See also the left door in FIG. 4), the doors 46 project horizontally towards each other with the inner edges of the doors 46 closely mating to effectively close the discharge area 36. To prevent loose material from escaping between doors 46, the doors also may include offset vertically ending angle iron bars 54 that interfit and overlap as shown in FIG. 5 or other such cooperating or overlapping mechanism. The advantage of the angle iron bars 54 is that it does not matter which door 46 closes first as the other door will sufficiently seal behind it. Each door 46 may be constructed with a frame of steel support bars 56 and steel plates 58. At the bottom ends of the doors 46, a wiper mechanism generally indicated at 62 is provided to engage the endless conveyor 30 as shown in FIGS. 8 and 9 for preventing material from escaping underneath the doors 34. The wiper mechanism 62 includes a resilient rubber blade 64 extending horizontally across the bottom edges of the doors and secured to the bottom support bar 56 via a clamp mechanism 66.

The doors 34 are pivotable from their closed position as shown in FIG. 3 to an open position as shown in FIG. 2 (see also FIG. 4 for one open and one closed door). This movement is accomplished by pivoting the doors 34 horizontally outwardly away from each other about their respective hinges 48. In the open position, the doors project rearwardly relative to the back edge 44 of the sidewalls 34 to move the effective discharge area further rearward. With the doors 46 extending rearward, loose material being expelled by the conveyor 30 must be driven further rearwardly and more deeply for example in the hopper of an asphalt paver (not shown) in order to clear the trailer 20. The doors 46 prevent material from prematurely exiting laterally sideways and instead forces the material further rearward.

It is an aspect of the present invention that the doors 46 are extended and retracted, and more specifically, opened and closed with a pair of extendible and retractable pneumatic cylinders 68. Although other actuators could also be used such as hydraulic cylinders, electrical motors, and the like, pneumatic actuation has the benefit of a readily assessable and reliable environmentally friendly source of compressed air via the trailer's air brake system. The pneumatic cylinders 68 are carried by the hopper 24 and may be mounted along the outside surfaces of the sidewalls 34 via pinned hinge 73 to a mounting plate 69 secured to the sidewall 34. Each cylinder 68 is operatively connected to the doors 46 through a mechanical linkage 70 such that the doors 46 can be pivoted about their respective hinges 48.

Figure 6:
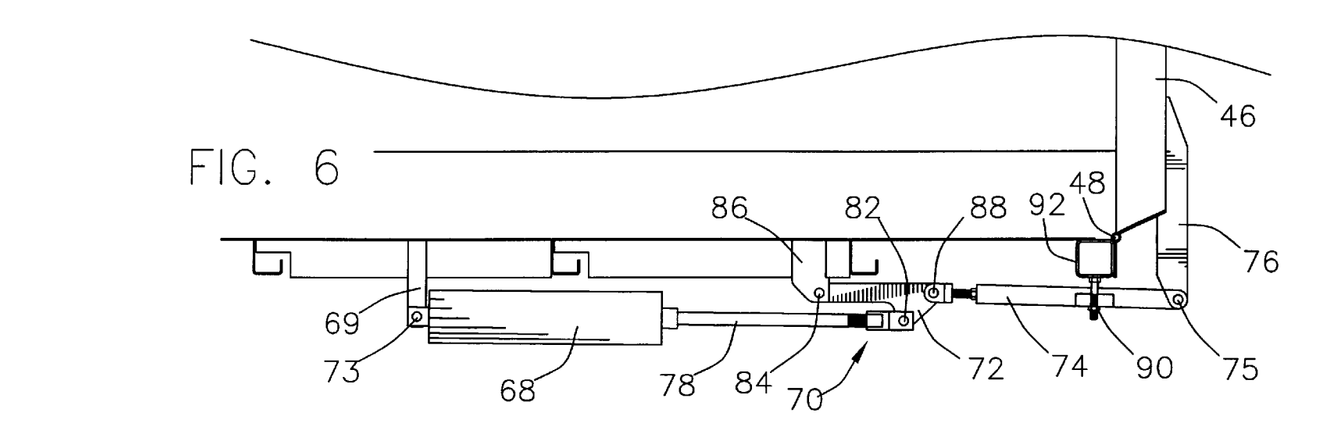
FIG. 6 is a cross section taken about line 6—6 in FIG. 4.
Figure 7:
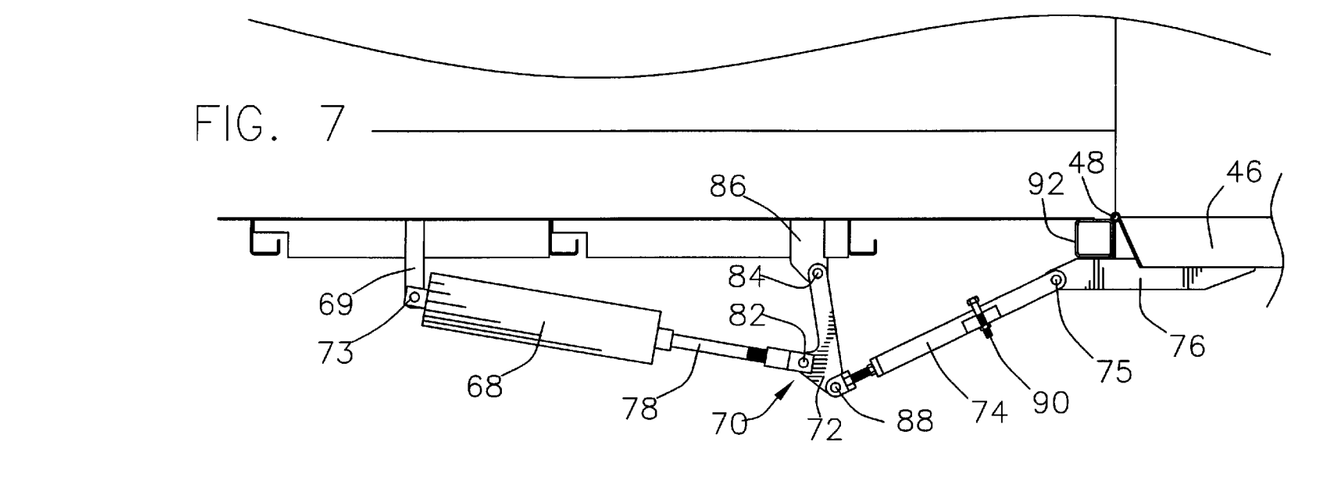
FIG. 7 is the same illustration as FIG. 6 but with the cylinder and mechanical linkage in a different position for opening the doors.

In the preferred embodiment, and referring to FIGS. 6 and 7, each mechanical linkage 70 comprises a pivot arm 72 and a linking arm 74 connecting the door 46 via door extension arm 76 to the rod 78 of the cylinder 68. The door extension arm 76 is securely fastened or welded to the door 46. The pivot arm 72 has three pivotable connections arranged in triangular spaced relation, including a first pivotable connection via a pinned hinge 82 to the end of the piston operated rod 78, a second pivotable connection via a pinned hinge 84 to a mounting plate 86 secured the sidewall 34, and a third pivotable connection via a pinned hinge 88 to the linking arm 74. The linking arm 74 is pivotably connected to the door extension arm 76 at a pivot point 75 offset from the door hinge 48.

In operation, opening the door 46 is achieved through retraction of the cylinder 68 that causes the pivot arm 72 to pivot clockwise about pinned hinge 84, which in turn retracts the linking arm 74 swinging the linking arm 74 slightly horizontally outward. The retraction of the linking arm 74 in turn imparts leverage on the door 46 to pivot the door 46 outwardly about its hinge 48. To close the door the reverse action is applied through expansion of the cylinder 68 in which the pivot arm 72 rotates counterclockwise. The inward swinging movement of the linking arm 74 is limited by an adjustable stop 90 that engages a vertical support post 92 of the sidewall 34.

In accordance with another aspect of the present invention, the preferred embodiment includes an automatic lock operatively connected to the doors 34. The lock is operable when the doors are fully closed to hold the doors in the fully closed position even when the load in the hopper 24 imparts a rearward horizontal opening force against the doors and when air pressure is lost in the cylinders 68 (the cylinders are normally pressured in the closed position). In the preferred embodiment, the lock is provided through an over center state of the mechanical linkage 70 which is illustrated in FIG. 6. In particular, the pivot arms 72 and linking arms 74 are in an over center state bent inwardly towards the sidewalls 34 of hopper 24 when the doors 46 are fully closed. The over center state is achieved through slight rotation of the pivot arm 72 after the doors 46 are fully closed through continued expansion of the cylinder 68. In this condition, any forward axial force in the linking arm 74 by virtue of load forces against the doors 46 urges the pivot arm inward (which keeps the doors closed) rather than outward (which would cause the doors to open). The adjustable stop 90 helps ensure the over center condition. Although one form of lock has been shown, it will be appreciated that other lock mechanisms that serve as a back up in case air pressure in the cylinders is lost.

It is a further aspect of the present invention that a distributed control 94 (either a single control or two separate controls) is provided and operatively connected to the cylinders 68 such that the cylinders 68 can be operated independently of each other. In this manner, different degrees of opening between fully closed and open positions can be achieved, to selectively direct discharged loose material left or right from the discharge area 36. The doors may also be selectively opened various degrees between fully open and closed positions such that a narrower stream of material is discharged from the trailer. When the doors 46 are in a partially open position, forward movement of the trailer during discharge via operation of the endless conveyor 30 effects a windrow of material.

It should be noted that the primary advantage of the present invention is that the doors 46 effectively extend the rear end of the trailer 20 when desired to discharge material further rearward from the trailer such as into the hopper of an asphalt paver. Although doors are one form of extension that can be used to extend the rear end of the trailer, certain claims appended hereto are meant to cover other mechanisms such as extensions that may take the form of linearly moveable panels that slide rearwardly and forwardly while still achieving the objects of the invention.

It is another advantage that the doors 46 or other extensions allow the rear wheels 22 to be located sufficiently close to the rear end 96 (currently 12 inches under federal underride guard regulations) for over-the-road transportation such that a rear under-ride guard is not necessary, while at the same time the live bottom trailer 20 is not rendered impractical for the significant application of filling hoppers of asphalt pavers, and other similar applications. As shown in FIG. 3, the rearmost wheels 22 are located within twelve inches of the rear end 96. However, as shown in FIG. 2, the effective rear end 98 can also be located much further rearward than twelve inches from the rearmost wheels 22 by virtue of the doors 46 in the open rearwardly projecting position. Thus, the trailer 20 easily meets current federal underride guard regulations promulgated by the Department of Transportation, National Highway Traffic Safety Administration under CFR part 571, FMVSS 223 and 224, and can be adapted to meet more stringent or looser future regulations if so promulgated.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A material transport apparatus adapted to be mobilized by a vehicle for transporting material, comprising:

a hopper structure supported on wheels such that the hopper is adapted to be mobile, the hopper structure including vertically extending sidewalls extending rearwardly from a front toward a discharge area, the hopper structure including an open top defined generally between the front, the discharge area, and the sidewalls;

a conveyor positioned generally at the bottom of the hopper structure between the front, the sidewalls and the discharge area, operative to convey material from the hopper structure toward the discharge area; and a pair of horizontally outwardly pivoting doors mounted to the hopper structure, the doors swinging horizontally outwardly and inwardly relative to each other to correspondingly open and close the discharge area; and a pair of actuators, one operatively connected to each door to pivot the doors horizontally inwardly and outwardly.

2. The material transport apparatus of claim 1 further comprising a distributed control separately and operatively connected to each actuator, wherein each door can be independently positioned such that different degrees of openings for each door may be selected to direct discharge of material from the hopper structure.

3. The material transport apparatus of claim 1 further comprising a lock operatively connected to the doors, the lock being operable when the doors are fully closed to hold the doors in the fully closed position when a rearward horizontal opening force is applied against the doors by virtue of material in the hopper structure and the actuator provides substantially no resistance to the rearward horizontal force.

4. The material transport apparatus of claim 1 wherein each door is hinged to one of the sidewalls, each actuator is a fluid powered cylinder mounted on the hopper structure, each cylinder being linked to its respective door by a mechanical linkage.

5. The material transport apparatus of claim 4 wherein each cylinder includes a first end pivotably mounted to the sidewall and a linearly translatable piston operated rod; and wherein each mechanical linkage comprises a pivot arm and a linking arm, the pivot arm having three pivotable connections arranged in triangular spaced relation, including a first pivotable connection to the end of the piston operated rod, a second pivotable connection to a mount on the sidewall, and a third pivotable connection to the linking arm, the linking arm being pivotably connected to the door.

6. The material transport apparatus of claim 5 wherein the pivot arms pivot inwardly towards the hopper structure to close the doors and outwardly to open the doors, and wherein the pivot arms and linking arms are in an over center state bent inwardly towards the hopper structure when the doors are fully closed such that the doors are maintained in the fully closed position when a rearward horizontal opening force is applied against the doors by virtue of material in the hopper structure and when the actuators provide substantially no resistance to the rearward horizontal force.

7. The material transport apparatus of claim 1 wherein the hopper structure has a rear end, the hopper structure being supported on wheels located a distance sufficiently close to the rear end such that a rear under-ride guard is not necessary under United States Federal Vehicle Regulations.

8. The material transport apparatus of claim 1 wherein the sidewalls are disposed at an inclined angle between horizontal and vertical, are wherein the doors are hinged to the sidewalls and disposed at an inclined angle between horizontal and vertical.

9. The material transport apparatus of claim 1 wherein the conveyor comprises an endless belt entrained around spaced apart sprockets, operatively connected to a motor.

10. A material transport apparatus adapted to be mobilized by a vehicle for transporting material, comprising:

a hopper structure supported on wheels such that the hopper is adapted to be mobile, the hopper structure including an open top for receiving material dumped therethrough and spaced apart sidewalls converging inwardly toward an open bottom, the sidewall extending rearwardly from a front end to a first rear end;

an endless conveyor positioned generally in the open bottom of the hopper comprising an endless belt entrained around spaced apart sprockets, the endless belt being operative to convey material from the hopper structure to the rear end of the hopper structure; and a pair of extensions, one for each side wall, the extensions being positionable to project rearwardly from the respective sidewalls and the first rear end to establish a second extended rear end located rearwardly of the first rear end such that the discharge area is effectively located further rearwardly.

11. The material transport apparatus of claim 10 wherein the extensions are carried by the sidewalls, further comprising at least one actuator operatively connected to the extensions, the actuator operable to extend and retract the extensions relative to the rear edges of the sidewalls.

12. The material transport apparatus of claim 10 wherein the extensions comprise a pair of horizontally outwardly pivoting doors, the doors being horizontally pivotable toward and away from each other to correspondingly open and close the discharge area.

13. The material transport apparatus of claim 12 wherein each door is hinged to one of the sidewall proximate the discharge area.

14. The material transport apparatus of claim 10 wherein the hopper structure has a rear end, the hopper structure being supported on wheels located a distance sufficiently close to the rear end such that a rear under-ride guard is not necessary under United States Federal Vehicle Regulations.

15. The material transport apparatus of claim 10 wherein the hopper structure is a trailer having a truck mounting structure adapted to be selectively mounted and dismounted to a vehicle.

16. The material transport apparatus of claim 10 wherein the hopper structure is permanent part of a vehicle.

17. The material transport apparatus of claim 11 wherein the sidewalls are disposed at an inclined angle between horizontal and vertical, and wherein the doors are disposed at an inclined angle between horizontal and vertical.

18. A method of discharging material from the rear end of a live bottom material transport apparatus, the transport apparatus comprising a hopper structure carrying loose material and supported on wheels such that the hopper is adapted to be mobile, the hopper including a conveyor adapted to transport material from the hopper toward a discharge area of the hopper, comprising:

providing a pair of doors at the discharge area, each door being hinged to the hopper such that the doors pivot horizontally outwardly away from one another, the doors having a closed position in which the discharge area is closed;

pivoting the doors horizontally outwardly away from each other to a position in which the discharge area has an discharge opening;

operating the conveyor to expel material rearwardly through the discharge opening; and maintaining the doors in a position in which the doors project rearwardly from the discharge area in a position to engage and direct the expelled material further rearwardly from the discharge area.

19. The method of claim 18 further comprising moving the hopper structure forwardly during the expelling of material to effect a windrow of material.

20. The method of claim 18 further comprising independently controlling the positions of the doors to selectively direction the flow of expelled material from the discharge opening.

21. The method of claim 18 further comprising:

closing the doors such that a load is retained in the hopper; and automatically locking the doors closed upon the doors reaching the closed position.

22. The method of claim 21 wherein a mechanical linkage connects the doors to the actuator, and wherein the step of automatically locking comprises moving the mechanical linkage to an over center position during the step of closing.

* * * * *